United States Patent
Ishikura et al.

(10) Patent No.: US 6,373,410 B2
(45) Date of Patent: Apr. 16, 2002

(54) APPARATUS FOR AND METHOD OF CONVERTING SAMPLING FREQUENCY OF DIGITAL SIGNALS

(75) Inventors: Tomoya Ishikura; Motoki Takase, both of Yamatokoriyama; Tsuyoshi Muramatsu, Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/826,889

(22) Filed: Apr. 6, 2001

(30) Foreign Application Priority Data

Apr. 7, 2000 (JP) .................................. 2000-106185

(51) Int. Cl.[7] .............................................. H03M 7/00
(52) U.S. Cl. ...................................................... 341/61
(58) Field of Search ............................ 341/61, 50, 51; 708/313

(56) References Cited

U.S. PATENT DOCUMENTS 5,903,487 A * 5/1999 Iwamura ..................... 341/61
6,154,154 A * 11/2000 Suzuki ....................... 341/61

* cited by examiner

*Primary Examiner*—Brian Young

(57) ABSTRACT

An input port receives input data X, generates input packets by adding generation numbers and node numbers indicative of prescribed destinations, in the order of reception, and in addition, generates a data packet from a separately input clock signal. The input data packet is written to an image memory using the generation number in the packet as an address signal, or read from the image memory using the generation number in the data packet as an address signal. Operation is performed in accordance with the input data packet or the data packet read from the image memory by a memory interface, and the processed data packet is output to the outside of a data driven engine, a memory interface or a data driven type processor.

6 Claims, 9 Drawing Sheets

FIG.4A  PRIOR ART  CI 
FIG.4B  PRIOR ART  RO
FIG.4C  PRIOR ART  CP 
FIG.4D  PRIOR ART  CO 
FIG.4E  PRIOR ART  RI 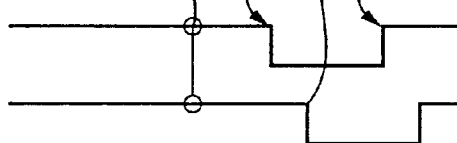

APPARATUS FOR AND METHOD OF CONVERTING SAMPLING FREQUENCY OF DIGITAL SIGNALS

BACKGROUND OF THE INVENTION

1. Field of the Invention

The present invention relates to method and apparatus for converting a sampling frequency of digital signals. More specifically, the present invention relates to an apparatus for and a method of converting a sampling frequency of digital signals in which sampling frequency of image data is converted, utilizing high speed parallel processing function of a data driven processor.

2. Description of the Background Art

In order to carry out various processings on information signals at a high speed and with a high precision, the information signals are generally converted into digital signals for processings. Image signals transmitting a large amount of information are also subjected to such conversion. The image signals are essentially analog signals, and thus are sampled at a certain sampling frequency for conversion into digital signals. Conversion of the sampling frequency of image signals also processes and transmits a large amount of information.

A conventional example of converting the sampling frequency of digital signals includes an apparatus for converting a sampling frequency of digital signals using a data driven processor disclosed, for example, in U.S. Pat. No. 5,327,125. In a data driven processor 4, a process proceeds in accordance with the rule that "when input data necessary for executing a certain process are all prepared, and resources including an arithmetic processor, necessary for that process are allocated, the process is executed."

A data processing apparatus including information processing operation of the data driven processor uses a data transmitting apparatus employing asynchronous handshake method. In such a data transmitting apparatus, a plurality of data transmission paths are connected, and the data transmission paths transmit/receive data transmission request signals and transfer permitting signals indicating whether data transfer is permitted or not, with each other, whereby autonomous data transfer is performed.

FIG. 3 is a block diagram showing a configuration of the data transmission path. Referring to FIG. 3, the data transmission path includes self-synchronous type transfer control circuits (hereinafter referred to as C elements) 2a to 2c, data holding circuits (pipeline registers) 3a to 3c, and logic circuits 3d and 3e performing operations and the like on outputs of the data holding circuits. C elements 2a to 2c include an input terminal CI receiving a transfer request signal from a preceding stage, an output terminal CO issuing a transfer request signal to a succeeding stage, an input terminal RI receiving a transfer permitting signal indicating permission or inhibition of transfer from the succeeding stage, an output terminal RO outputting a transfer request signal to the preceding stage, and a control signal output terminal CP controlling pipeline registers 3a to 3c.

FIGS. 4A to 4E are timing charts representing the operation of the C elements shown in FIG. 3. When the terminal CI (or terminal CO) shown in FIG. 4A is at "0", it represents a state in which the data transfer request is issued to the preceding stage (succeeding stage), and when it is at "1", it represents the state in which data transfer request is not issued to the preceding stage (succeeding stage). When the terminal RI (or terminal RO) is at "0" as shown in FIG. 4E, it represents that the succeeding stage (preceding stage) is in the transfer inhibited state and when it is "1", it means that the succeeding stage (preceding stage) is in a transfer permitted state. When the terminal CI of a C element changes from "1" to "0", that is, when data transfer is requested from the preceding stage and transferred, the terminal RO changes from "1" to "0", whereby further data transfer from the preceding stage is inhibited.

When transfer is completed, the input to the terminal CI changes from "0" to "1", setting a state in which data transfer request is not issued from the preceding stage, notifying that the setting of data from the preceding stage to the C element of interest has been complete. Accordingly, the terminal RO shown in FIG. 4B changes from "0" to "1", notifying the preceding stage that the next transfer is permitted. When the input to the terminal CI attains to "1" and data transfer request from the preceding stage is stopped, a clock pulse is output from the terminal CP shown in FIG. 4C, data are output from pipeline registers 3a to 3c, and an operation is performed by logic circuits 3d and 3e. When the terminal CO shown in FIG. 4D changes from "1" to "0", data transfer request is issued to the succeeding stage and the data is transferred to the succeeding stage, the input to the terminal RI changes from "1" to "0", notifying that the succeeding stage has been set to the transfer inhibited state. In response, the output of the terminal CP is set to "0", control to the pipeline register is stopped, and thereafter, the terminal CO changes from "0" to "1", to be set to the state in which data transfer request is not made to the succeeding stage. When the data is stored in the pipeline register of the succeeding stage and further, output to the next logic circuit, terminal RI changes "0" to "1", whereby the succeeding stage is set to the transfer permitted state. By the repetition of this cycle, the next data is transferred, processing such as an operation is performed, and data is transferred in the self-synchronous system.

FIG. 5 is a block diagram of the data driven type processor having the data transmission path shown in FIG. 3. Referring to FIG. 5, the data driven processor Pe includes a junction unit JNC, a firing control unit FC, a processing unit FP, a program storing unit PS, a branching unit BRN, a plurality of pipeline registers 3a to 3c and C elements 2a to 2c. The operation of the C elements 2a to 2c is as described above.

FIGS. 6A and 6B represent an input data packet and an output data packet input to and output from the data driven processor Pe shown in FIG. 5.

The input data packet shown in FIG. 6A and the output packet shown in FIG. 6B include a destination node number field storing a destination node number, a generation number field storing a generation number, an instruction code field storing an instruction code, and a data field storing data. The input image signal is stored in the data storing field. The generation number is an identification number for distinguishing data groups to be processed in parallel from each other. The destination node number is a number for distinguishing input data of the same generation from each other, and indicates a transfer destination of the data packet in the data driven type information processing apparatus. The instruction code is for executing an instruction stored in an instruction decoder.

When the data packet shown in FIG. 6A is input to data driven processor Pe, the input packet is first passed through junction unit JNC, transmitted to firing control unit FC, and a data pair is formed between data packets having the same destination node number and the same generation number.

More specifically, two different data packets having identical node number and the generation number are detected, and of these two having the same numbers, one data packet is additionally stored in the data field of the other packet, and the resulting data packet is output. The data packet storing the data pair in the data field is transmitted to the operating unit FP. The operating unit FP receives the transmitted data packet as an input, based on the instruction code in the input data packet, performs a prescribed operation on the contents of the data packet, and stores the result of operation in the data field of the data packet. This data packet is transmitted to the program storing unit PS.

The program storing unit PS reads, based on the destination node number of the transmitted data packet, the destination node number of the next rank and the instruction code of the next rank, from the program memory in the program storing unit PS. The read destination node number and the destination code are stored in the destination node number field and the instruction code field of the data packet, respectively.

The data packet output from the program storing unit PS is transmitted to the branching unit BRN, and externally output or returned to the junction unit JNC based on the destination node number, and again, input to the data driven processor Pe. Such transmission is executed, controlled by the above described C elements 2a to 2c. One or a plurality of such data driven processors Pe are connected, forming the data driven type information processing apparatus.

The data packet storing an instruction to access a memory inside or outside the data driven type information processing apparatus handles the value in the generation number field in the packet as a memory address, for accessing the memory. A field FE, a line LN and a pixel PX in the generation number field of the data packet represent the bank (1 field), a row and a column, respectively.

FIG. 7 is a block diagram of a sampling frequency converting circuit of a conventional data driven type processor, described in U.S. Pat. No. 5,327,125.

Referring to FIG. 7, the sampling frequency converting circuit 4 includes an input port 5, a data driven engine 6, a memory interface 7 and an output port 8, and an image memory 9 is connected to sampling frequency converting circuit 4. An image signal x as an input signal is applied to input port 5 and a data packet is generated therefrom and applied to data driven engine 6. The data packet applied to data driven engine 6 is stored through memory interface 7 in image memory 9, the sampling frequency converting operation is performed, and after the process, the data packet is again applied through interface 7 and data driven engine 6 to output port 8. The packet applied to output port 8 is externally output as a data packet Y. The data in the data field of the externally output data packet provides image signal which has been interpolated and frequency-converted.

FIG. 8 shows correspondence between the image in the image memory, the data included in the generation number field of the data packet and the memory cell. Referring to FIG. 8, field address FD specifies a field area of the image memory 9. The area designated by the field address FD in image memory 9 may be a bank (when 1 field corresponds to 1 frame), or it may correspond to one field memory. The correspondence is appropriately determined in accordance with the configuration of the image memory 9. The line address LN specifies a row in the field. The data driven type processor shown in FIG. 5 executes processing in accordance with a data flow program. The data flow program is described in a form of a directed graph consisting of nodes (referred to as actors) indicative of operation and control, and arcs extending between the nodes.

FIG. 9 shows an example of the data flow program (referred to as a data flow graph). Referring to FIG. 9, a node NDA performs an operation OP1 on data applied to input arcs a and b when the input nodes are prepared, and transmits the results of operation onto an output arc e. A node NDB, which has input arcs c and d, performs an operation OP2 on input data which are prepared on these arcs, and supplies the result of operation onto an output arc f. A node NDC transmits the data on the input arc e onto an output arc g, when a signal on the control arc f is "true". In each node, the operation allocated to the node is executed upon preparation of data (referred to as "tokens") on the input arcs. Execution of the operation is referred to as "firing" of node.

As a result of firing, the input data (hereinafter referred to as input tokens) are consumed to produce an output token. For example, the node NDA is fired when the input data arrive at the two input arcs a and b and the output arc e is empty. At this time, the nodes NDA and NDB can be fired simultaneously if the input data arrive at the input arcs c and d. The node NDC must wait completion of operations of the nodes NDA and NDB. The node NDC can be fired after the completion of operations of the nodes NDA and NDB.

In general, a node having n inputs and n outputs can be achieved by combination of basic nodes each having two or less inputs and two or less outputs. The basic node may be an operation node performing an operation on the data applied to input arcs, a distribution node copying the input token and sending the same to a plurality of output arcs, a junction node transmitting data applied to the plurality of input arts to an output arc, and a control node controlling a path for transmitting data.

FIG. 10 shows a program example in the form of a data flow graph in the sampling frequency converting circuit of a conventional example. Referring to FIG. 7, an input port 5 receives digital signals sampled at the sampling frequency, and adds generation number and node number representing prescribed destination, in the order of reception, to generate input packets. The data driven engine 6 performs an operation process in accordance with the input data packet and the data packet read from memory interface 7. Memory interface 7 reads and writes from and to image memory 9, using the generation number in the input data packet as an address signal.

The program example shown in FIG. 10 is the one described in U.S. Pat. No. 5,327,125 mentioned above, in which image data converted to the sampling frequency of 32.4 MHz is interpolated and converted to image data of the sampling frequency of 48.6 MHz, in the image processing in accordance with MUSE (multiple sub-nyquist subsampling encoding).

First, input data X1, X2, . . . time-sequentially applied to input port 5 shown in FIG. 7 are converted to data packet format, with generation number and node number added in the order of input. The data packets are written in the order of generation numbers of the data packets, to an image memory 9, in accordance with an instruction [WR] at node 401. In this example, writing of data packets to the image memory 9 is performed at every other pixel address positions. The reason for this is that when the 32.4 MHz sampling data are converted to 48.6 MHz sampling data, the number of data increases as the interpolation data are added. When the data that has been subjected to sampling frequency-conversion are again written to the image memory 9, overwriting by the interpolation data must be prevented before reading the originally written input data.

In parallel with the operation on node 401, an operation "AGN" is executed at node 402. In the operation "AGN" at node 402, the right data is fixed data "0", and, upon application of the input data packet, the operation is performed on the fixed constant "0" and the input data packet. This operation "AGN" is an instruction by which copying to the data field is carried out using the generation number of the input data packet as data, and the data packet is output. Therefore, generation number is stored in the data field.

The output of node 402 is applied to a node 403. The node 403 performs an "AND" operation on the data contained in the data field of the output data packet from node 402 with the fixed data "1". Thereby, "1" is written into the data field of the data packet having the odd generation, and data "0" is written into the data field of the data packets having even generation. Thus, the image data of odd and even generations are separated from each other.

The data series is applied to a node 404 after the above separation of the image data of odd and even generations by the node 403. In an operation "EQ" by the node 404, if the data in the data field of the data packet is "1", "1" is written therein. If not, "0" is written thereinto.

Output of node 404 is applied to a node 405. The node 405 is a control gate, and passes left data applied from the node 404 if the right data, that is, output data of node 404 is "1". If not, it extinguishes the data applied to its left input arc. Thereby, only data packet corresponding to the image data of odd generation appears from the node 405.

The sampling frequency is converted using only the image data of odd generation sent from the node 210. Only the data packet corresponding to the odd generation image data is utilized in order to simultaneously output three data, Y1, Y2 and Y3, upon receipt of one data packet, for example, X5. This is equivalent to the output of three converted image data with respect to two input image data, and therefore, image data can be obtained of which sampling frequency is 1.5 times the sampling frequency of arbitrary image data. For example, when the processing of the data flow type program shown in FIG. 10 is performed on the image data having the sampling frequency of 32.4 MHz, image data converted to the sampling frequency of 48.6 MHz, that is, 1.5 times the original frequency of 32.4 MHz, can be obtained.

The odd generation data packet is applied to nodes 406 and 407. Here, an example will be described in which the data packet storing the generation number of image data X5 is applied to node 406. In the node 406, data having the generation number (FD, LN, PX) of (0, 0, −2), that is, the data stored in image memory 9 at an address −2 from the pixel address of X5, is read.

As already described, the data packet are written to every other pixel addresses (double addresses), and therefore, data packet of image data X4 preceding by one generation is read. Thereafter, when sent to node 408, the data stored at the address of (0, −6), that is, the data stored in image memory 9 at an address −6 from the pixel address of X5 is read. Thus, data packet of image data X2 preceding by three generations is read from image memory 9.

At node 407, data packet of image data X5 is read from (0, 0, 0), that is, from image memory 9. The image data X5 read by node 407 is applied to node 409. Node 409 provides an offset of −4 to the generation number, so that image data X3 preceding by two generations is read. Thereafter, at node 410, an offset of −8 is applied to the generation number of image data X5 and the image memory 9 is accessed. Thus, image data X1 preceding by four generations than image data X5 is read. Thus, five image data X1, X2, X3, X4, and X5 necessary for sampling frequency conversion are read.

Thereafter, an operation process is executed, in order to execute sampling frequency conversion with interpolation. The data X5 read by the operation of node 407 is applied to nodes 418 and 427. Node 418 multiplies image data X5 by a constant $\alpha 6$. Node 427 performs an operation of multiplying the image data X5 by $\alpha 4$.

The data X4 read by node 406 is applied to nodes 411, 419 and 428, and multiplied by the constant $\alpha 5$, $\alpha 3$ and $\alpha 1$ at respective nodes. The data X2 read by the operation of node 408 is applied to nodes 412, 420 and 429, and at respective nodes, the constant data X2 is multiplied by numbers $\alpha 2$, $\alpha 0$ and $\alpha 2$. Further, the data X2 read by the operation of node 408 is also applied to nodes 413, 421 and 430, and the data X2 is multiplied by constants $\alpha 1$, $\alpha 3$, and $\alpha 5$, respectively. The data X1 read by the operation of node 410 is applied to nodes 414 and 422, and at respective nodes, data X1 is multiplied by constants $\alpha 4$ and $\alpha 6$.

The result of operation from node 411 and the result of operation from node 412 are added at node 415. The result of operation of node 413 and the result of operation of node 415 are added at node 416. The result of operation of node 414 and the result of operation of node 416 are added at node 417. Thus, data packet corresponding to image data Y1 is generated. Further, the result of operation of node 418 and the result of operation of node 419 are added at node 423. The result of operation of node 420 and the result of operation of node 423 are added at node 424. The result of operation of node 421 and the result of operation of node 424 are added at node 425. The result of operation of node 422 and the result of operation of node 425 are added at node 426, whereby a data packet corresponding to image data Y2 is generated.

The result of operation of node 427 and the result of operation of node 428 are added at node 431, the result of operation of node 431, the result of operation of node 431 and the result of operation of node 429 are added at node 432, and the result of operation of node 430 and the result of operation of node 432 are added at node 433. Thus, a data packet corresponding to image data Y3 is generated. The sampling frequency conversion with image signal interpolating process in the data flow from node 411 to node 433 can be realized by the equation 434 of FIG. 10.

In the conventional data driven type processor, when the specification of the image signal interpolating process is to be changed, it is necessary to change various parameters including $\alpha 1$, $\alpha 2$, $\alpha 3$, $\alpha 4$, $\alpha 5$ and $\alpha 6$ of the matrix 434-*a*, and when specification of the sampling frequency conversion is to be changed, it is necessary to change all of the input data 434-*b*, output data 434-*c* and conversion parameter matrix 434-*a*.

As already described, the conventional apparatus for converting sampling frequency of digital signals can meet the specification of the sampling frequency conversion with interpolation. This is because the data driven type processor performs processing of input data and the data read from a memory outside the data driven type processor, in accordance with a program in the form of a data flow.

In the sampling frequency converting apparatus using the conventional data driven type processor, however, when the program specification for performing sampling frequency conversion with interpolation represented by the equation 434 of FIG. 10 is to be changed, timing adjustment is necessary, including determination of the parameter matrix 434-*a* related to the sampling frequency, and final determination must be done after actual operation. Therefore, change of the specification is difficult.

Further, there is a physical limit in storing the programs in the program memory. If the apparatus for converting sampling frequency of the digital signals described in U.S. Pat. No. 5,327,125 were to be realized by a conventional data driven type processor, a formidable amount of memory would be occupied to store the programs. When processes other than sampling frequency conversion, for example, gamma correction, RGB conversion and the like are to be additionally performed on the image data, problems of memory shortage and decrease in processing speed resulting from the amount of programs will be experienced.

SUMMARY OF THE INVENTION

Therefore, an object of the present invention is to provide a method and an apparatus for converting sampling frequency of digital signals of which specification can be readily changed by simply changing clock timings, when the specification of sampling frequency conversion is to be changed.

Briefly stated, the present invention provides an apparatus for converting sampling frequency of digital signals, for converting sampling frequency of digital signals sampled at a first sampling frequency to a second, different sampling frequency, including: a first data packet generating circuit receiving the digital signals sampled at the first sampling frequency, adding generation numbers and destination node numbers representing prescribed destinations in the order of reception, to generate data packets; a storing circuit for storing the data packets; a writing circuit writing the generated data packets using the generation numbers of the data packets as address signals to the storing circuit; a second data packet generating circuit generating a data packet by adding a generation number and a destination node number representing a prescribed destination, in the order of reception, in accordance with the second sampling frequency; a reading circuit reading a data packet storing arbitrary neighboring digital signals sampled at the first sampling frequency from the storing circuit, in response to the generation number of the data packet generated by the second data packet generating circuit; and an interpolating circuit dividing sampling positions of neighboring digital signals sampled at the first sampling frequency by the second sampling frequency, and interpolating the data of the divided position by the neighboring digital signal sampled at the first sampling frequency.

Therefore, according to the present invention, a sampling frequency converting apparatus having a desired characteristic can be implemented, simply by changing the timings of the clock signals input from a clock input terminal driving a packet automatic generating mechanism different from a conventional input port, without the necessity of newly forming a resolution converter when specification of the sampling frequency conversion should be changed, for example.

In a more preferred embodiment, the writing circuit stores the data sampled by the first sampling frequency or the interpolated data in the data packet generated by the second data packet generating circuit, in accordance with the generation number, and writes the data packet in the storing circuit, while the reading circuit outputs a data packet read in accordance with the generation number from the storing circuit.

In a more preferred embodiment, in the sampling frequency conversion, simply by changing the second sampling frequency to a desired value in the second data packet generating circuit, the second sampling frequency can be arbitrarily changed.

In a more preferred embodiment, a circuit for digitizing the arbitrary second sampling frequency and determining resolution at the time of conversion to the generation number is provided separately.

According to another aspect, the present invention provides a method of converting sampling frequency of digital signals, for converting sampling frequency of digital signals sampled at the first sampling frequency to a second, different sampling frequency, including: the first step of receiving digital signals sampled at the first sampling frequency, adding generation numbers and destination node numbers representing prescribed destinations in the order of reception, to generate data packets; the second step of storing the data packets generated in the first step using the generation numbers of the packets as address signals; the third step of generating a data packet by adding a generation number and a destination node number representing a prescribed destination in the order of reception, in accordance with the second sampling frequency; the fourth step of reading a data packet storing arbitrary neighboring digital signals sampled at the first sampling frequency, in accordance with the generation number of the data packet generated in the third step, among the stored data packets; and the fifth step of dividing sampling positions of the neighboring digital signals sampled at the first sampling frequency by the second sampling frequency, and interpolating the data of the divided position by the neighboring digital signal sampled at the first sampling frequency.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A to 4E are timing charts representing the operation of the C elements shown in FIG. 3.

DESCRIPTION OF THE PREFERRED EMBODIMENTS

Figure 1:
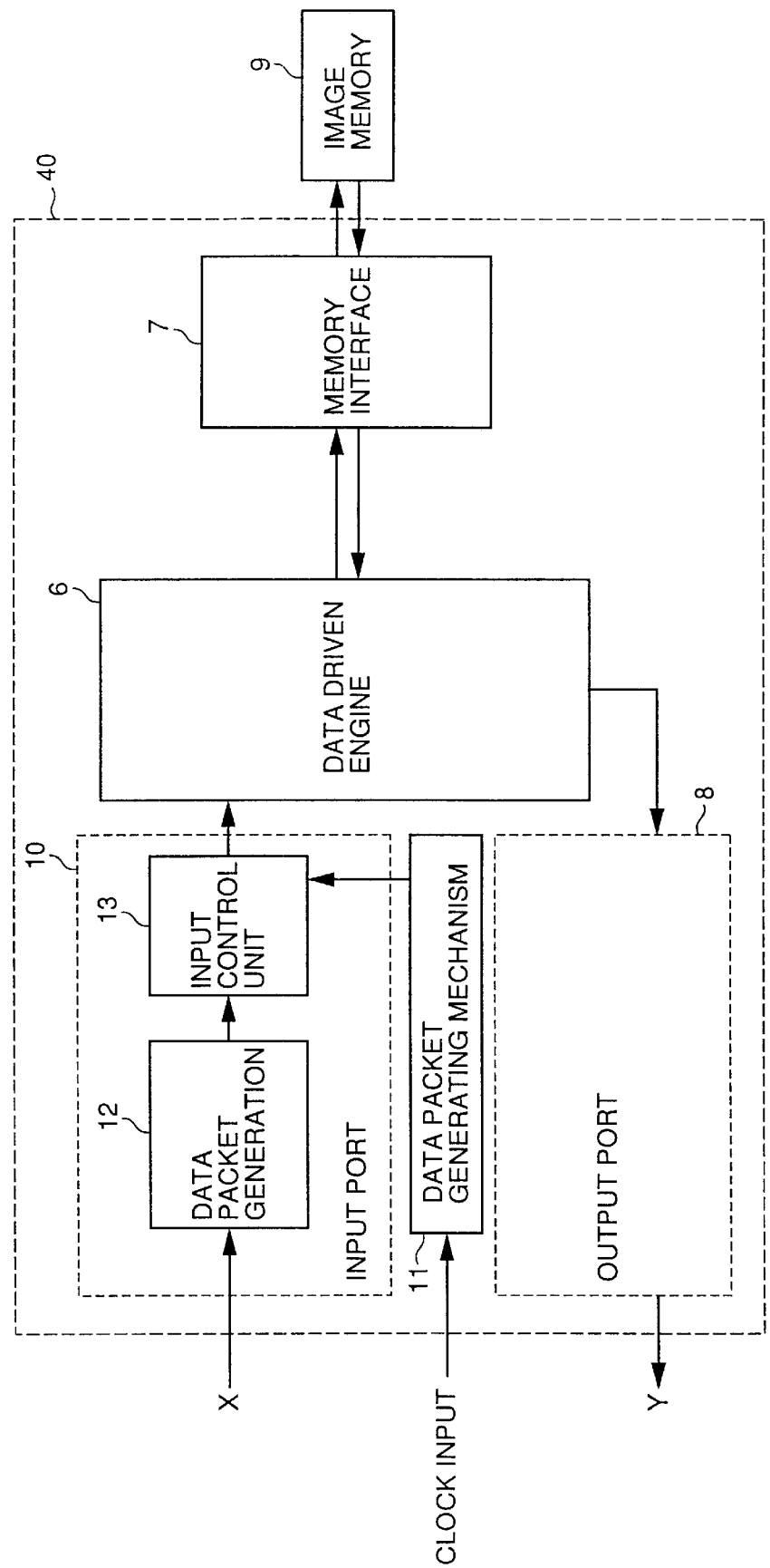
FIG. 1 is a schematic block diagram of the sampling frequency converting circuit in accordance with an embodiment of the present invention.
Figure 7:
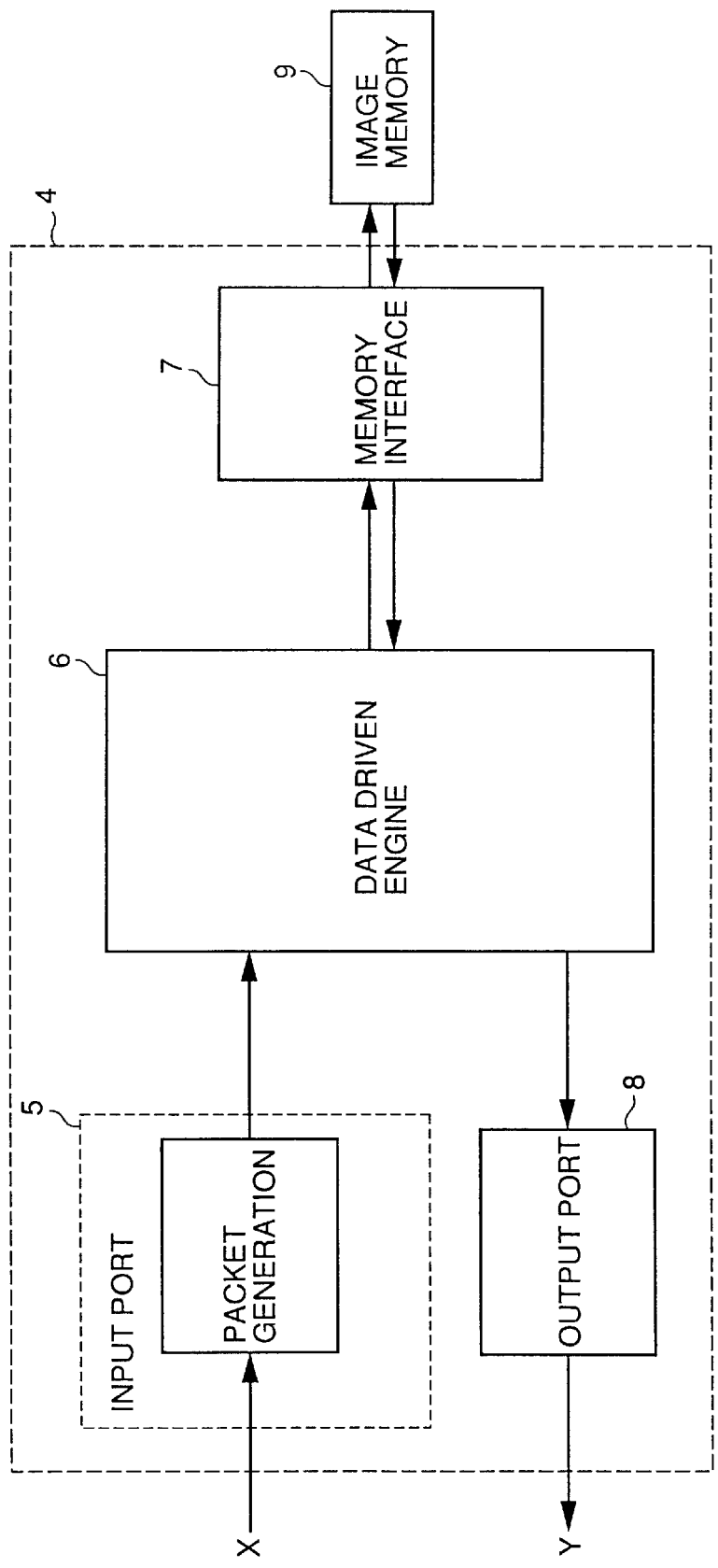
FIG. 7 is a block diagram of a sampling frequency converting circuit using a conventional data driven type processor.

FIG. 1 is a block diagram showing an example of the circuit for converting sampling frequency of image data, using a data driven type processor in accordance with an embodiment of the present invention. Referring to FIG. 1, a sampling frequency converting circuit 40 includes, similar to the configuration shown in FIG. 7, data driven engine 6, memory interface 7 as writing and reading circuits, and output port 8. The sampling frequency converting circuit is different in that a data packet generating unit 12 and an input control unit 13 are incorporated in input port 10, and that a data packet generating mechanism 11 is newly provided.

The data packet generating mechanism as the first data packet generating means generates a data packet for storing data interpolated for performing desired frequency conversion, from the clock that has been input to a clock input terminal. Data packet generating unit 12 in input port 10 receives input data X, adds a generation number and a node number representing a prescribed destination in the order of reception to generate an input packet, and serves as the second data packet generating means.

Input control unit 13 as the interpolating means in input port 10 refers to the destination node numbers of the data packet storing the image data X generated by the data packet generating unit 12 and the data packet storing the interpolated data for performing the desired frequency conversion generated by the data packet generating mechanism, and transmits a data packet to data driven engine 6. Data driven engine 6 is formed including one or a plurality of data driven processors Pe as described with reference to FIG. 7.

Data driven engine 6 executes processing in accordance with the destination node number included in the read data packet. At the time of execution of the processing, an operation is performed on the read data packet in accordance with an instruction allocated to the destination node number. Data driven engine 6 generates, in response to one input data packet, data packets of such a number, that the ratio between the input data packets and data packets generated by a clock different from that for the input data packet is given as the ratio between the sampling frequency of the former and the sampling frequency of the latter. Generally, data that has been subjected to frequency conversion process, such as the sampling frequency conversion, is used when the data is requested by a component succeeding an output port of the sampling frequency converter (for example, a component outside the data driven type processor). Therefore, it will be more efficient if the clock is sent from the data requesting side (a component succeeding the output stage of the data driven type processor) to the data driven type processor, in view of the processing speed of the data driven type processor. Therefore, it is practical to place the clock input terminal on the output side.

Figure 2:
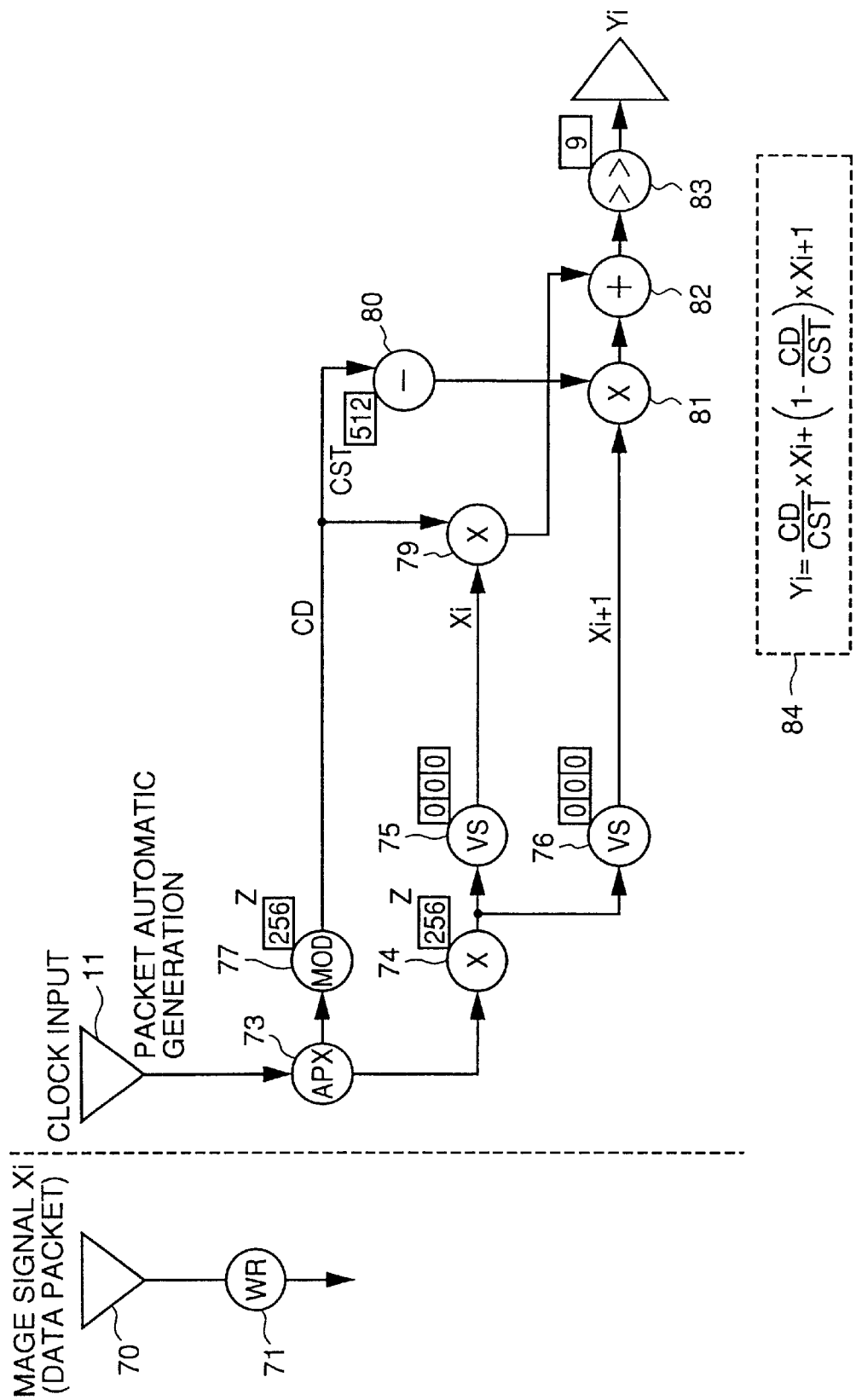
FIG. 2 shows an example of the data flow program for converting resolution of an image in accordance with an embodiment of the present invention.
Figure 3:
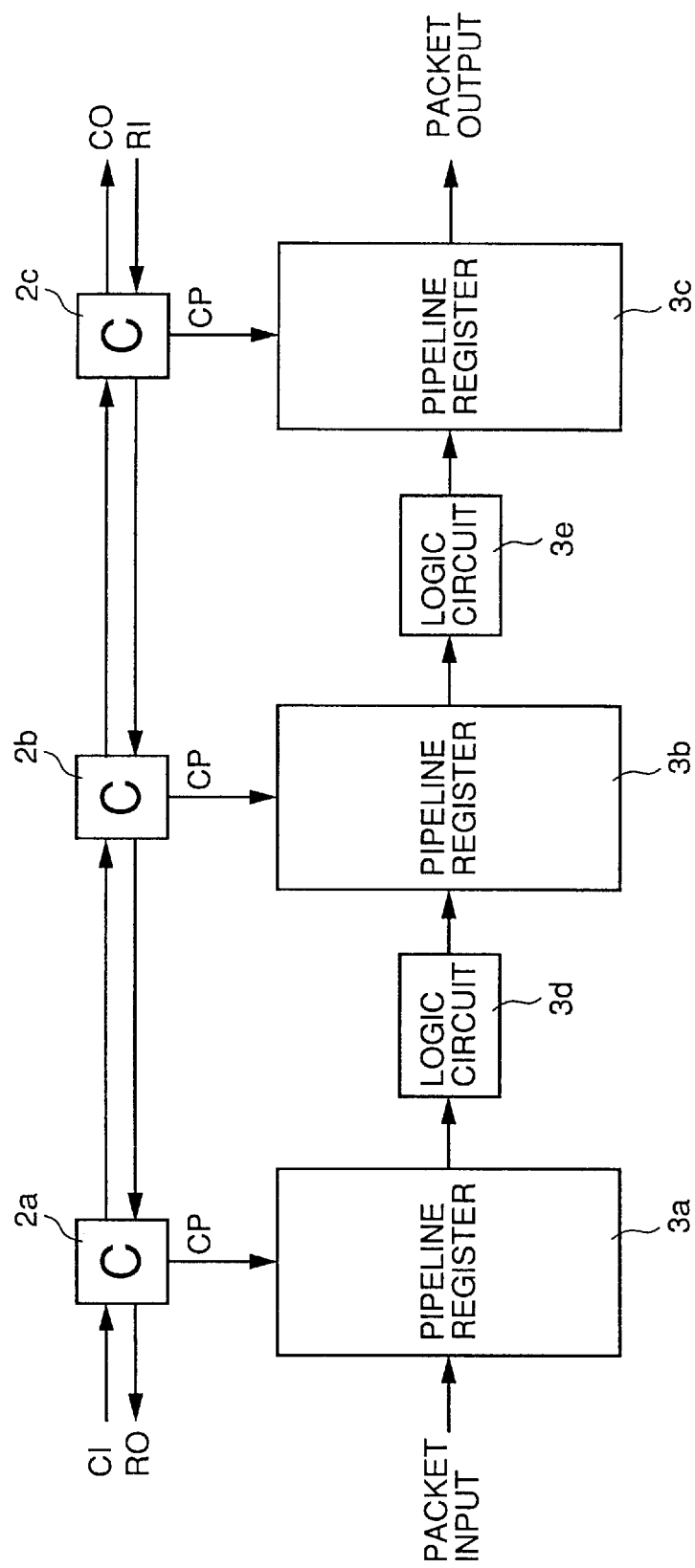
FIG. 3 is a block diagram representing a configuration of a data transmission path.
Figure 5:
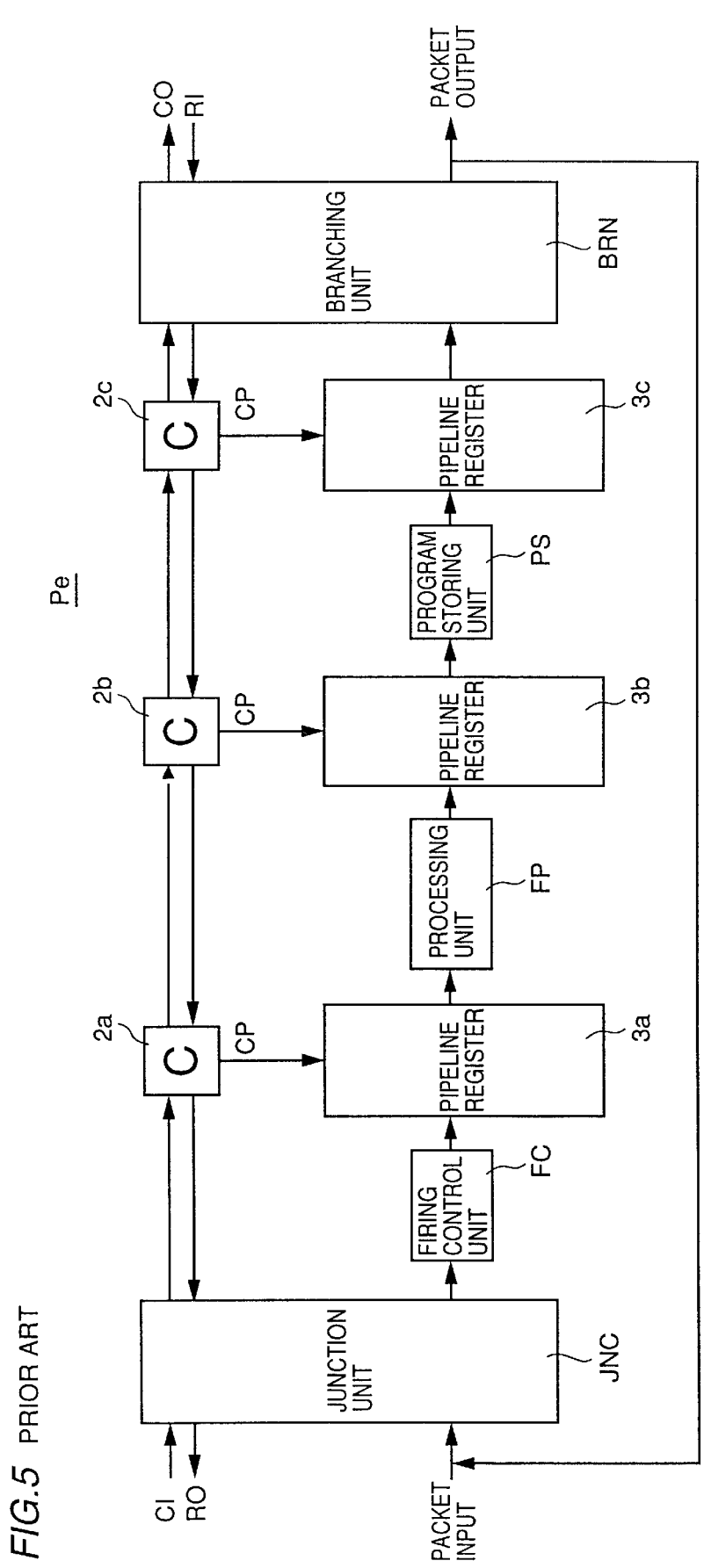
FIG. 5 is a block diagram of a data driven type processor having the data transmission path shown in FIG. 3.
Figure 6A:
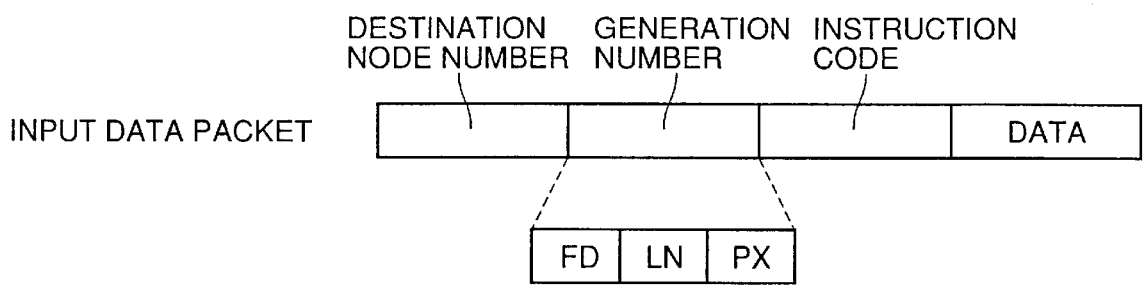
FIGS. 6A and 6B represent data packet formats.
Figure 6B:
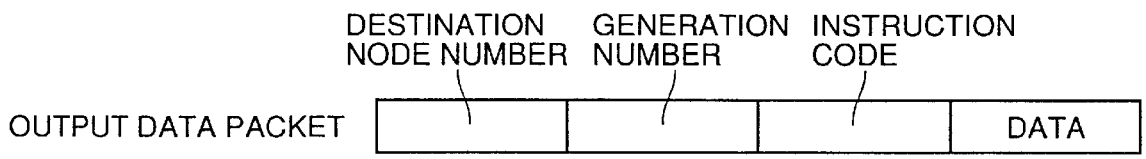

FIG. 2 shows an example of the program in the form of a data flow graph, of a resolution converter implemented by the data driven type processor in accordance with one embodiment of the present invention. Referring to FIG. 2, input image data X1 applied time-sequentially to input port 70 are converted to data packet format with destination node number and generation number allocated in the order of reception. The data packet is applied to a firing control unit with program storage (one of the plurality of units based on the data driven type processor Pe) in data driven engine 6. The firing control unit with program storage writes the generated data packets in the order of generation numbers, to image memory 7 in accordance with addresses based on the generation numbers shown in FIG. 6, in response to an WR instruction at node 71.

By the clock introduced through the clock input terminal, the generation number and the destination node number are allocated to the packets in the order of input of the packets, by the data packet generating mechanism 11. At this time, the data field is empty. The packet generated by data packet generating mechanism 11 is subjected to an operation APX at node 73. The operation APX is a 1-input, 2-output instruction, by which a pixel PX is extracted from the generation number of the input data packet, and updates the value of the data field of the data packet by the extracted value. At this time point, the data of the data field of the data packet generated by the data packet generating mechanism is written. At this time, the pixel PX is the data in the data field of the data packet.

Node 77 updates the data field of the packet by a reminder of a division of a left data by a right data, where the left data is the data field of the data packet and the right data is the fixed data "256". More specifically, lower 9 bits of the value in the data field are extracted, and the data field is updated by the value.

The data packet transmitted to node 74 has its data field updated by multiplication of the left data by the right data, where the left data is the value in the data field of the packet, that is, the pixel PX and the right data is the fixed data "256". This is identical to an 8-bit left-shift of the data field.

Figure 8:
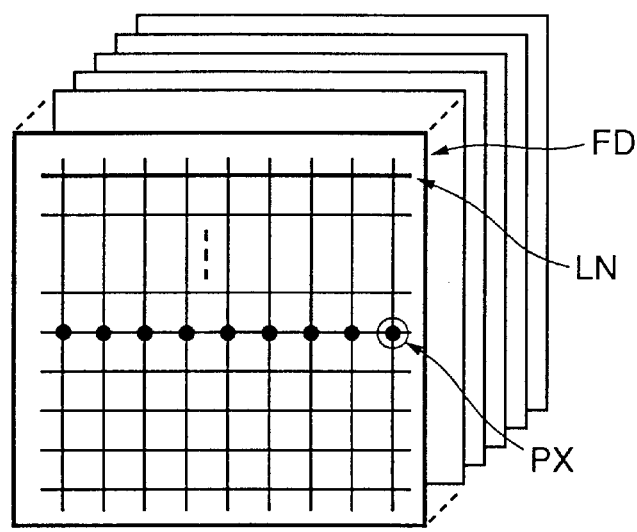
FIG. 8 represents correspondence between the image in the image memory, data included in the generation number field in the data packet and the memory cells.
Figure 9:
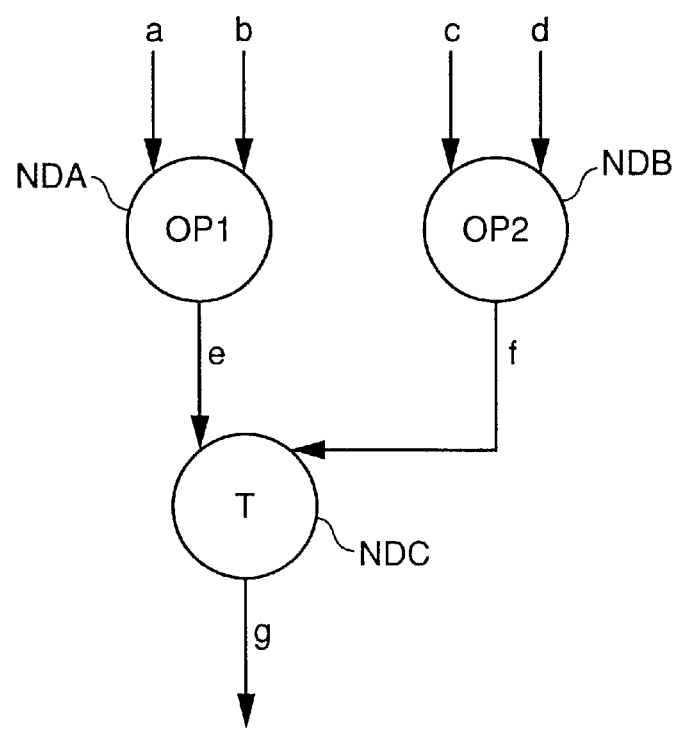
FIG. 9 shows an example of a data flow program of a conventional data driven type processor.

As shown in FIG. 2, here, the fixed value Z of the right data of nodes 77 and 74 is 256 in the present description. The value, however, can be set arbitrarily. The value Z is used for digitizing the generation number (here, PX value) of each data packet generated in response to an arbitrary clock input, by approximation to a value close to the reciprocal number of the Z value, that is, 0, 1/256, 2/256, . . . , 255/256 and 1. Therefore, the larger the Z value, the higher the precision in approximation of the original pixel PX shown in FIG. 8. When a value of $2^n$ such as 128, 256 or 512 is used as the value Z, multiplication or division can be done simply by shifting the data in the data field to the right or to the left and to take out the desired data. Thus, calculation can be simplified.

The value CST, which will be described later, corresponds to the ratio of frequency conversion of image data Yi converted to the desired digitized sampling frequency, with respect to the sampling frequency of the input image data Xi, and therefore, the operation means conversion to CST/Z times. By arbitrarily changing the value CST/Z, desired frequency conversion ratio can be obtained easily.

As a result of the operation of nodes 74 and 77, the data field of the data packet resulting from the operation of node 77 is updated by the decimal portion of the value in the data field of node 73, while the data field of the data packet resulting from the operation of node 74 is updated by the integer part of the value of the data field of node 73. An instruction BS at nodes 75 and 76 is a 1-input, 1-output instruction, in which the value of the data field is PX, which value is used as an address signal, and the data field is updated by referring to the data written in that address of image memory 9 which is obtained by off-setting the address signal. The offset value of node 75 is 0, and hence the data field in the packet is updated by the data Xi written to the image memory 9 which is the destination of reading designated by the address signal. Thus, the data field in the data packet contains the data Xi. Node 76 provides an offset of +1 to the pixel number, and therefore, the data Xi+1 written in the address different by one from that read by node 75, and the data field of the packet is updated thereby. At this time, the data field of the data packet contains the data Xi+1.

Node 79 receives an output from node 75, that is, the data read from VS, and an output of node 77 as inputs, and provides the product as an output. Node 80 performs subtraction of the right data from the left data, where the left data is the fixed data 512 (CST=512) and the right data is the data transmitted from node 77, and provides the result as an output to node 81. Node 81 receives the data read by the VS of node 76 and the output of node 80 as inputs, and transmits the resulting output to node 82.

Node 82 adds the result of operation of node 81 to the result of operation of node 79, and transmits the result to node 83. Here, the value of the data field of the data packet is larger than the desired value by CST times, and therefore, the value of the data field is processed to be 1/CST, at node 83. In the data flow program, a right shift is performed by CST bits of LOG2, and the data field is updated by the resulting value. More specifically, where CST is 512, the calculation to obtain 1/512 is division by $2^9$, and therefore, the value is shifted to the right by 9 bits, and the resulting data is extracted.

The data field in the data packet is updated by the result of operation, and a data packet Yi is output. The data packet Yi can be calculated by the equation 84 of FIG. 2, that is, $$Yi=CD/CST \times Xi+(1-CD/CST) \times Xi+1.$$

For example, when CD/CST is set to 0.5, it is possible to interpolate a central point between adjacent two points. Interpolation is realized by approximation by a value on a line connecting adjacent two points (Xi, Xi+1). As the interpolation is possible by simplest approximation, the data flow program can also be realized easily. By this interpolation, it becomes possible to generate image data of three points from image data of two points by adjusting the ratio of CST with respect to CD, and it is possible to easily change the spatial position of image memory 9 to be interpolated.

Change in the specification of resolution conversion can be addressed not by changing the data flow program but by changing the timing at the clock input terminal provided separate from the input port, so that the image data after desired resolution conversion can be obtained at an output port of the data driven type processor.

In the data driven type processor, when data necessary for operation at various nodes are prepared (ready), there is a firing and the operation is executed. Therefore, without the necessity of timing adjustment of input signals such as experienced in a general digital circuit not using the data driven type processor, processing such as the resolution conversion can be done at high speed with high reliability.

As described above, according to an embodiment of the present invention, an input terminal receiving a clock signal of a desired sampling frequency as an input is provided separate from an input port, a data packet generating mechanism generating a data packet in accordance with the clock signal is provided, and the resolution conversion of the input image is processed by the data driven type processor. Therefore, at the time of change of the specification of sampling frequency conversion, for example, simply by changing the timing of the clock signal input from the clock input terminal driving the packet automatic generating mechanism separate from the conventional input port, an apparatus for converting sampling frequency having a desired characteristic can be realized easily, without the necessity of newly forming a resolution converter, for example.

To address the change in specification of a conventional converter, it was necessary to change the data flow program. By contrast, according to the embodiment of the present invention, what is necessary is only to change the timing of the clock signal. Thus, change in specification can be addressed far easier and at higher speed as compared with the prior art.

Figure 10:
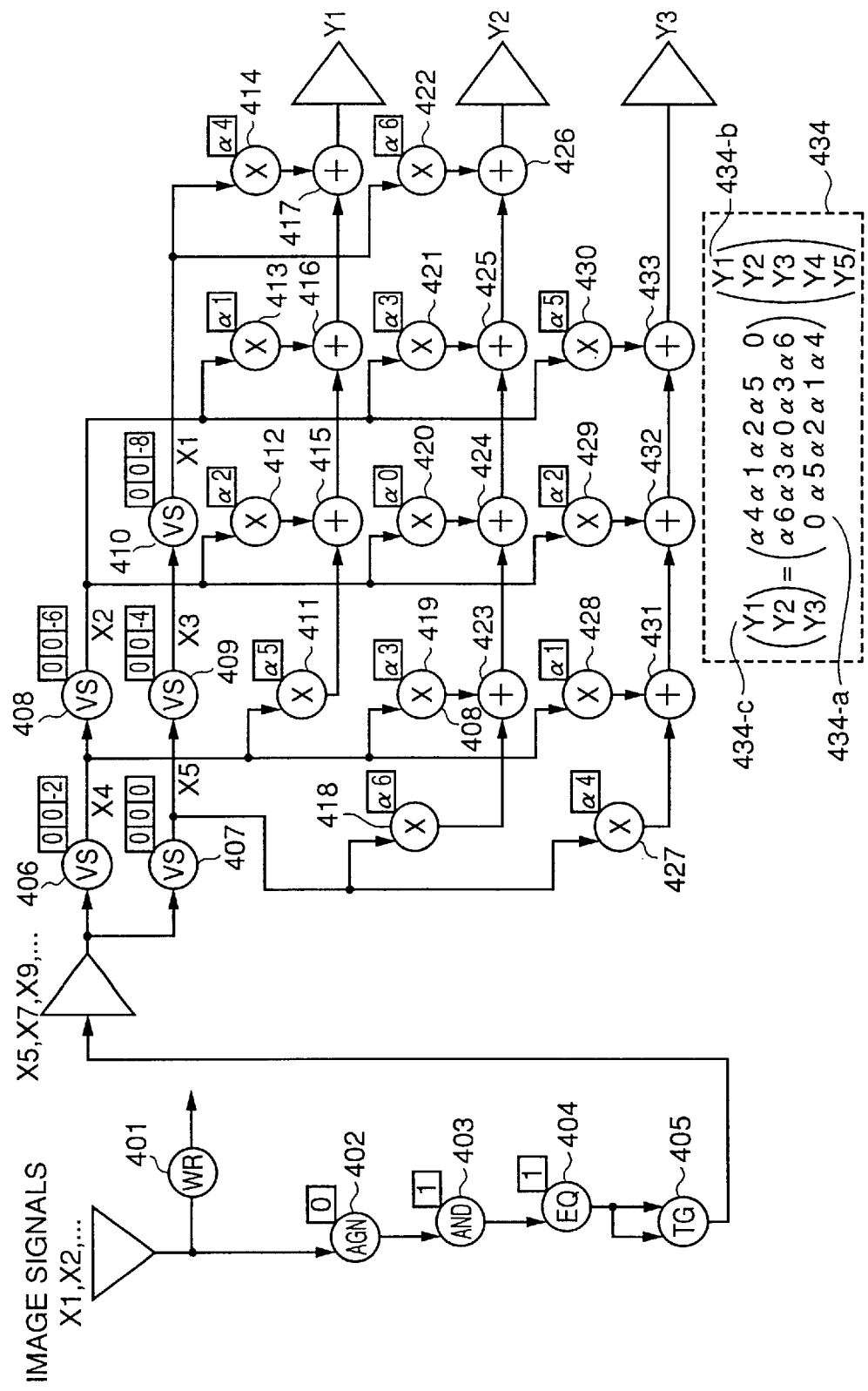
FIG. 10 shows an example of a program in the form of a data flow graph of a conventional sampling frequency converting circuit.

Further, as to the program in the form of a data flow for sampling frequency conversion with interpolation necessary for resolution conversion, the data flow program in accordance with the embodiment of the present invention shown in FIG. 2 is smaller than the data flow program for sampling conversion of the prior art shown in FIG. 10, and the amount of calculation is reduced by 40%. Therefore, the processing capability in resolution conversion can be improved by 2.5 times, and the amount of memory occupied for storing the program necessary for the resolution conversion process can be saved by 40%.

The embodiment of the present invention may be used in sampling frequency converters with various interpolations. For example, it is effective to change the sampling frequency with interpolation when image data received by a facsimile is to be output and printed after expansion to a desired paper size (A4 size to B4 size).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for converting sampling frequency of digital signals, for converting sampling frequency of digital signals sampled at a first sampling frequency to a second, different sampling frequency, comprising:

a first data packet generating circuit receiving the digital signals sampled at said first sampling frequency, and adding generation numbers and destination node numbers representing prescribed destinations in an order of reception, to generate data packets;

a storing circuit storing the data packets;

a writing circuit for writing said generated data packets using the generation numbers as address signals, to said storing circuit;

a second data packet generating circuit generating a data packet by adding a generation number and a destination node number representing a prescribed destination in said order of reception, in accordance with said second sampling frequency;

a reading circuit reading a data packet storing arbitrary adjacent digital signals sampled at said first sampling frequency from said storing circuit, in accordance with the generation number of the data packet generated by said second data packet generating circuit; and an interpolating circuit dividing sampling positions of said adjacent digital signals sampled at said first sampling frequency by said second sampling frequency, and interpolating the data of the divided position by the adjacent digital signal sampled at said first sampling frequency.

2. The apparatus for converting sampling frequency according to claim 1, wherein said writing circuit stores the data sampled at said first sampling frequency or the data interpolated by said interpolating circuit in the data packet generated by said second data packet generating circuit and writes to said storing circuit, in accordance with said generation number; and said reading circuit outputs the data packet read from said storing circuit in accordance with the generation number.

3. The apparatus for converting sampling frequency according to claim 1, wherein
said second data packet generating circuit is capable of converting an arbitrary second sampling frequency, simply by changing said second sampling frequency to a desired value.

4. The apparatus for converting sampling frequency according to claim 2, wherein
said second data packet generating circuit is capable of converting an arbitrary second sampling frequency, by simply changing said second sampling frequency to a desired value.

5. The apparatus for converting sampling frequency according to claim 3, further comprising
a circuit determining resolution when said arbitrary second sampling frequency is digitized and changed to a generation number.

6. A method of converting sampling frequency of digital signals, for converting sampling frequency of digital signals sampled at a first sampling frequency to a second, different sampling frequency, comprising:
the first step of receiving digital signals sampled at said first sampling frequency, and adding generation numbers and destination node numbers representing prescribed destinations in an order of reception to generate a data packets;
the second step of storing the data packets generated in said first step using the generation number of the packets as address signals;
the third step of generating a data packet by adding a generation number and a destination node number representing a prescribed destination in said order of reception, in accordance with said second sampling frequency;
the fourth step of reading data packet storing arbitrary adjacent digital signals sampled at said first sampling frequency, in accordance with the generation number of the data packet generated in said third step, among said stored data packets; and
the fifth step of dividing sampling positions of said adjacent digital signals sampled at said first sampling frequency by said second sampling frequency, and interpolating the data at the divided position by the adjacent digital signal sampled at the first sampling frequency.

* * * * *